United States Patent
Lundén

(10) Patent No.: US 7,477,719 B2
(45) Date of Patent: Jan. 13, 2009

(54) CONTROL ROD AND A CONTROL ROD BLADE FOR A BOILING WATER REACTOR

(75) Inventor: Anders Lundén, Västerås (SE)

(73) Assignee: Westinghouse Electric Sweden AB (SE)

( * ) Notice: Subject to any disclaimer, the term of this patent is extended or adjusted under 35 U.S.C. 154(b) by 0 days.

(21) Appl. No.: 10/575,975

(22) PCT Filed: Oct. 13, 2004

(86) PCT No.: PCT/SE2004/001468

§ 371 (c)(1),
(2), (4) Date: Apr. 13, 2006

(87) PCT Pub. No.: WO2005/038819

PCT Pub. Date: Apr. 28, 2005

(65) Prior Publication Data

US 2007/0127618 A1    Jun. 7, 2007

(30) Foreign Application Priority Data

Oct. 14, 2003  (SE) ................... 0302707

(51) Int. Cl.
*G21C 7/00*    (2006.01)
(52) U.S. Cl. .............. 376/327; 376/333; 376/335; 376/339
(58) Field of Classification Search .......... 376/327, 376/333, 335, 339
See application file for complete search history.

(56) References Cited

U.S. PATENT DOCUMENTS

| | | | | |
|---|---|---|---|---|
| 3,448,008 A | * | 6/1969 | Hellman | 376/327 |
| 4,676,948 A | * | 6/1987 | Cearley et al. | 376/333 |
| 4,876,060 A | * | 10/1989 | Yoshioka et al. | 376/333 |
| 4,888,150 A | * | 12/1989 | Vesterlund | 376/333 |
| 5,034,185 A | * | 7/1991 | Ueda et al. | 376/333 |
| 5,225,151 A | * | 7/1993 | Bernander et al. | 376/333 |
| 5,276,718 A | * | 1/1994 | Ueda | 376/220 |
| 6,470,061 B1 | * | 10/2002 | Helmersson | 376/333 |

FOREIGN PATENT DOCUMENTS

WO    WO 02101754 A1    12/2002

OTHER PUBLICATIONS

Control Rod for Nuclear Reactor, Research disclosure, Kenneth Mason Publications, Hampshire, GB, 1992, vol. 339, Nr. 25, ISSN 0374-4353; Fig. 1.
International Search Report dated Jan. 4, 2005.

* cited by examiner

*Primary Examiner*—Rick Palabrica
(74) *Attorney, Agent, or Firm*—Michaud-Duffy Group LLP

(57) ABSTRACT

The present invention relates to a control rod blade for a boiling water reactor. The control rod blade comprises a plurality of channels, which are arranged to receive an absorber material, a free edge portion with a recess, which comprises outlets for said channels, and a cover element , which is arranged to be attached by means of at least one welding operation such that it seals at least a part of said recess . Furthermore, the control rod blade comprises a profile element , which, before said welding operation of the cover element is performed, is arranged to be applied against a bottom surface in the recess in a position such that the profile element covers the outlets of said channels.

14 Claims, 3 Drawing Sheets

CONTROL ROD AND A CONTROL ROD BLADE FOR A BOILING WATER REACTOR

CROSS-REFERENCE TO RELATED APPLICATIONS

This application is entitled to the benefit of and incorporates by reference essential subject matter disclosed in International Application No. PCT/SE2004/001468 filed on Oct. 13, 2004 and Swedish Patent Application No. 0302707-5 filed on Oct. 14, 2003.

FIELD OF THE INVENTION

The present invention relates to a control rod and a control rod blade for a boiling water reactor, wherein the control rod blade comprises a plurality of channels, which are arranged to receive an absorber material, a free edge portion with a recess, which comprises outlets for said channels, and a cover element, which is arranged to be attached by means of at least one welding operation such that it seals at least a part of said recess.

BACKGROUND OF THE INVENTION

Usually, control rods for boiling water reactors (BWR) comprise a central part and four control rod blades protruding from the central part, each provided at a right angle in relation to the adjacent control rod blades. Usually, conventional control rod blades are manufactured of a sheet of a steel material. The control rod blades are at a free edge portion provided with a longitudinally milled recess. A plurality of channels is drilled in the recess in a row above each other. The channels have a diameter, which is less than the thickness of the metal sheet such that a satisfactory wall thickness is obtained. The channels extend from the free edge portion of the control rod blade towards the central part of the control rod. Thereafter, a suitable absorber material is applied in the channels. The absorber material may be powdered or in the form of pins. The absorber material is enclosed by rolling the legs of the recess together. Thereafter, the end surfaces of the legs are welded together by a longitudinal weld joint so that a hermetic and pressure resistant sealing of the recess is achieved.

A relatively deep recess must be provided at the edge portion of the control rod blade in order for the legs to obtain a sufficient length such that they can be rolled together. In a welded state, the free edge portion of the control rod blade gets a rounded shape and the absorber material must therefore be arranged at a not completely negligible distance from the end surface of the control rod blade. In order to increase the reactivity effect of the control rod blade, it would be desirable if the absorber material could be arranged closer to the end surface.

SE 519 331 shows a control rod blade comprising a plurality of channels which are arranged to receive an absorber material. The control rod blade has a free edge portion with a recess which comprises outlets for said channels in a bottom surface. A cover element is arranged to be attached in the recess in order to seal the edge portion. The cover element is substantially T-shaped and comprises a cover portion which seals the opening of the recess, and a support portion which is arranged to give the cover element a support against the bottom surface of the recess. The cover element is attached in the recess by means of two longitudinal weld joints. The support portion has here a width which is less than the width of the outlets of the channels. Thereby, the outlets of the channels are not sealed but they are connected to each other via the elongated passages, which are obtained on both sides of the support portion.

The elongated passages have here the task of allowing a pressure equalisation between the channels during operation and to allow a distribution of a protective gas to the root side of the weld joints during the welding operation. This cover element is intended to be used for control rod blades, which are provided with a solid absorber material such as, for example, absorber pins. If a powdered absorber material would be used, there is a risk that the powdered absorber material whirls up during the welding operation and is mixed into the weld joint.

By a profylax published in Research Disclosure 33925/92, a control rod blade is shown, which is provided with a concave recess at a free edge portion. In order to seal the recess, a cover element with a substantially corresponding concave shape is here applied in the recess. The cover element comprises a cover portion, which is arranged to seal the opening of the recess, and a support portion, which comprises a convex contact surface, which is arranged to get into abutment with a corresponding concave wall surface of the recess. The cover element is attached in the recess by means of two longitudinal weld joints. The contact surface of the support portion comprises a chamfered portion such that a longitudinal passage is formed between the support portion and the wall surface of the recess in a mounted state. This passage allows, during operation, a free flow of fission gases between the channels such that a pressure equalisation is obtained. The cover element comprises two elongated passages in connection with the weld joints. These elongated passages allow a distribution of a protective gas to the root side of the weld joints during the welding operation.

The cover element has here a shape such that the channels with absorber material are not connected to the elongated passages, which allow a distribution of a protective gas to the root side of the weld joints. Thereby, this control rod blade is suited to be provided with a powdered absorber material. However, the cover element has a relatively complicated shape, which makes it difficult to manufacture. Furthermore, the concave-shaped recess results in that the channels, at least locally, open out at a relatively large distance from the end surface of the control rod blade. The possibility of arranging the absorber material near the end surface of the control rod blade for achieving a high reactivity effect is here considerably reduced.

SUMMARY OF THE INVENTION

The object of the present invention is to provide a control rod blade, which has a construction such that a high reactivity effect during operation is achieved at the same time as a sealing of the control rod blade is allowed without the risk that the absorber material is whirled up and being mixed into the weld joint.

The above-mentioned objects are achieved with the control rod blade of the initially mentioned kind, which is characterized in that the control rod blade comprises a profile element, which, before said welding operation of the cover element is performed, is arranged to be applied against a bottom surface in the recess in a position such that the profile element covers the outlets of the channels. Since the profile element is applied such that it seals the outlets of the channels, the absorber material is prevented from whirling up and mixed into the weld joint during the welding operation. Thereby, the risk is eliminated that the cover element is attached in the recess with deficient weld joints, which comprise whirled-up absorber material.

According to a preferred embodiment of the present invention, the profile element has a width, which substantially corresponds to the width of the bottom surface. A profile element with such a width is simply applied by means of its form fit in a correct position between the side walls of the bottom surface. The profile element will thereby cover all outlets of the channels. Preferably the profile element comprises a substantially planar surface which is arranged to be applied against a corresponding substantially planar bottom surface. Both the profile element and the recess may thereby be given a relatively uncomplicated shape. The profile element may comprise at least one curved side portion which has an extension upwards from the substantially planar surface. Hereby, the profile element obtains a form fit such that the application of the profile element in a correct position is further simplified. The risk that the absorber material passes the profile element during the welding operation is thereby further reduced.

According to another preferred embodiment of the present invention, the profile element has a thickness of about 0.2-0.5 mm.

Consequently, the main object of the profile element is to retain the absorber material in the channels during the welding operation such that it does not whirl up and is mixed into the weld joint. With a suitable choice of material, a relatively thin profile element may perform this task. A thin profile element also does not substantially encroach on the space of the absorber material and thereby it does not substantially reduce the possibility to apply the absorber material near the free end surface of the control rod blade. However, the profile element has a thickness such that it is possible to handle it during the application process without the risk that it is folded or deformed in any way. Advantageously, the profile element has a continuous extension along the whole length of the recess. A profile element without joints minimizes the risk for local weakenings where the absorber material can whirl up and be mixed into the weld joint. Consequently, one single such elongated profile element is applied in the recess after that the channels have been filled with absorber material and before the cover element is attached by welding in the recess. Preferably, the profile element is manufactured of a metal material. Preferably, the metal material is a stainless steel. A plurality of types of stainless steels have properties which make them suitable to use in this context.

According to another preferred embodiment of the present invention the cover element comprises a surface which is arranged to abut a surface of the profile element when the cover element is applied in the recess.

Such a contact between the cover element and the profile element allows the profile element to be retained in the intended position. Thereby, the cover element also achieves a correct position for the following welding operation. The contact surfaces of the cover element and the profile element are preferably substantially plane.

According to another preferred embodiment of the present invention, the cover element comprises a cover portion is arranged to seal the opening of the recess, and a support having a width less than the width of the recess. Such a cover element, which may have a substantially T-shaped cross sectional profile, is simple and relatively inexpensive to manufacture. Consequently, the cover portion covers the opening of the recess when it is applied in the recess. However, narrow gaps are inevitably formed between the edges of the cover element and the legs of the recess. These gaps allow for distribution of a protective gas to the elongated passages, which are formed on both sides of the support portion. Such a supply of a protective gas facilitates the welding together of the edges of the cover element with the inner surfaces of the legs and the formation of weld joints with a high quality. The weld joints may be accomplished with a TIG-welder.

According to another preferred embodiment of the present invention, the recess comprises a groove, which, after the profile element is applied in the recess, is arranged to form a passage between at least two adjacent channels under the profile element. The profile element thereby forms a wall which divides this passage from the passages which are located externally of the profile element on both sides of the support portion of the cover element. This passage, which is arranged internally of the profile element has the purpose of connecting the channels to each other. With such a passage, which connects all channels to each other the pressure testing of the channels after the cover element has been attached by welding, is facilitated. The passage also has the purpose of providing a distribution of the fission gases which are created during operation such that a substantially equal pressure is achieved in the channels.

According to another preferred embodiment of the present invention, said absorber material is powdered. The problem with whirling-up absorber material is present substantially only when powdered absorber material is used. Consequently, the present control rod blade is therefore very suitable to use with a powdered absorber material. Advantageously, the absorber material comprises powdered boron carbide. Boron carbide is the most commonly used absorber material. The channels of the control rod blades may also be filled with a combination of a powdered absorber material and a solid absorber material. The solid absorber material may here be hot isostatic pressed or sintered boron carbide pins or hafnium pins. The channels may also be filled with encased boron carbide powder. Consequently, the control rod blade has a construction, which makes it especially suited to receive a powdered absorber material. However, this does not in any way prevent that it is filled only with a solid absorber material or an encased powdered absorber material.

The invention also relates to a control rod for a boiling water reactor. Such a control rod comprises usually four control rod blades directed at a right angle in relation to the adjacent control rod blades. A control rod with control rod blades according to the above provides a high reactivity effect during operation at the same time as the end surfaces of the control rod blades are sealed with weld joints of a guaranteed high quality.

BRIEF DESCRIPTION OF THE DRAWINGS

In the following, as an example, a preferred embodiment of the invention is described with reference to the attached drawings, in which.

DETAILED DESCRIPTION OF A PREFERRED EMBODIMENT OF THE INVENTION

Figure 1:
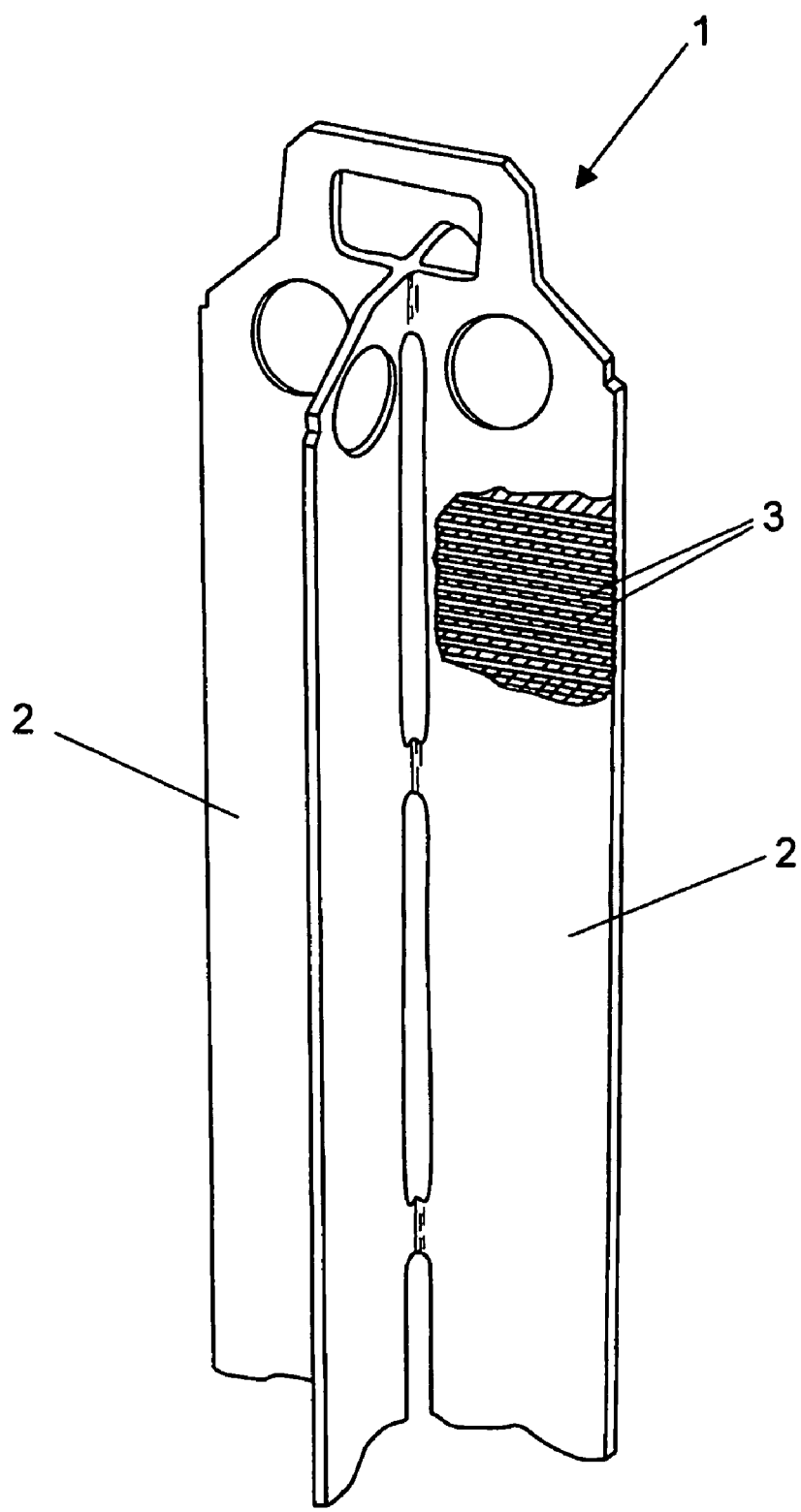
FIG. 1 shows a perspective view of a control rod for a boiling water reactor with four control rod blades.

FIG. 1 shows a control rod 1 for controlling the neutron flux in a boiling water reactor (BWR). The control rod 1 comprises four control rod blades 2, which are directed at a right angle in relation to the adjacent control rod blades 2. The control rod blades 2 comprise a plurality of above each other, in rows, drilled channels 3, which extend between a free edge portion of the control rod blades 2 and a centre, where the control rod blades 2 meet. The control rod blades 2 are manufactured of a sheet material, which preferably is of metal, for example steel, and have a thickness of 7-8 mm. The channels 3, which are drilled in the control rod blades 2, may here have a diameter of about 5-6 mm.

Figure 2:
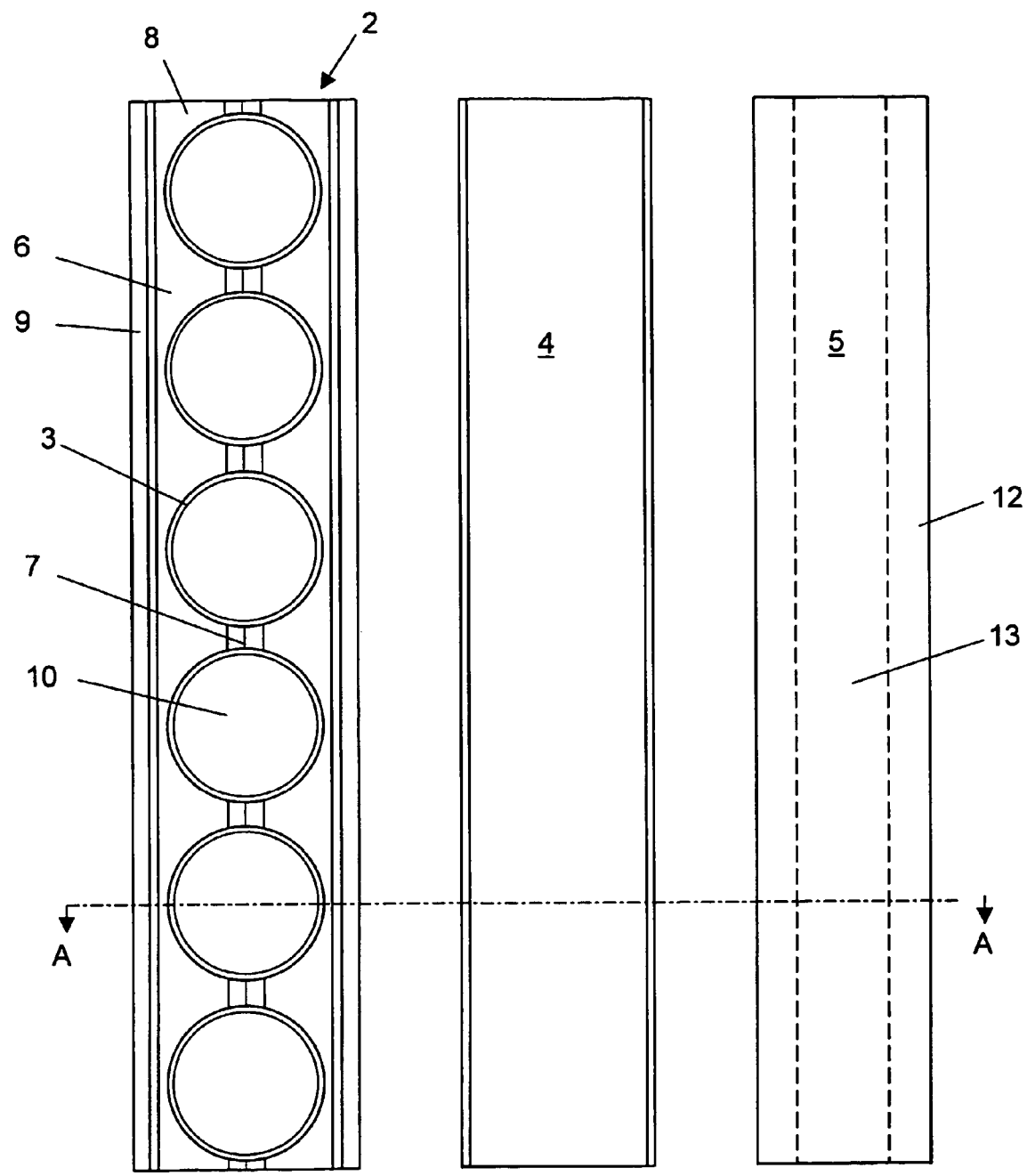
FIG. 2 shows a free edge portion of a control rod blade, a profile element and a cover element according to the present invention.

FIG. 2 shows an edge portion of a control rod blade 2 and a profile element 4 and a cover element 5, which allows a sealing of the edge portion. Consequently, the control rod blade 2 comprises a sheet material the free end surface of which is provided with a first substantially U-shaped track 6 by means of a milling operation. The first track 6 has an extension along a substantial part of the free. end surface of the sheet material. Thereafter, a second narrower triangular shaped track 7 has been milled centrally in the first U-shaped track 6. The first track 6 and the second track 7 form together a recess 8 in the free edge portion of the control rod blade 2. The recess 8 is restricted laterally by upright legs 9. After or before the milling of the first track 6 and the second track 7, a large number of straight channels 3 with a circular cross section have been drilled in the control rod blade 2. Consequently, the channels 3 extend between the free edge portion of the control rod blade 2 and a centre, where the control rod blades 2 meet. The channels 3 have a diameter, which is less than the width of the first track 6 but which exceeds the width of the second track 7. The centrally arranged second track 7 thus achieves an extension only in the areas between the outlets of the channels 3 in the recess 8. In the FIG. 2, the outlets of six channels 3 are shown. The channels 3 are here filled with a powdered absorber material 10. Preferably, the powdered absorber material 10 is boron carbide. However, the channels 3 of the control rod blade are not restricted to be filled only with a powdered absorber material 10 but it may be filled with a combination of a powdered absorber material and a solid absorber material. The solid absorber material may here be hot isostatic pressed or sintered boron carbide pins or hafnium pins. The channels 3 of the control rod blade may also be filled only with a solid absorber material or an encased powdered absorber material.

FIG. 2 also shows an elongated substantially plate-shaped profile element 4, which is arranged to be applied in the recess 8 in a position such that the profile element 4 covers the outlets of said channels 3. Advantageously, the profile element 4 is manufactured of a metal, for example stainless steel. It has a thickness of about 0.1-0.5 mm.

Preferably, the profile element 4 has a length and a width which substantially correspond to the length and the width of the recess 8. Finally, FIG. 2 shows a cover element 5, which is arranged to seal the opening of the recess 8 in a mounted state. The cover element 5 has a length, which corresponds to the length of the recess 8. The cover element 5 has a cover portion 12, which has a width, which substantially corresponds to the width of the recess 8. The upper surface of the cover portion 12 is arranged to substantially form the end surface of the control rod blade in a mounted state. In FIG. 2, a support portion 13 of the cover element 5 is marked with broken lines. The support portion 13 has a continuous extension along the whole length of the cover element 5. The support portion 13 has a width, which is less than the width of the recess 8.

Figure 3:
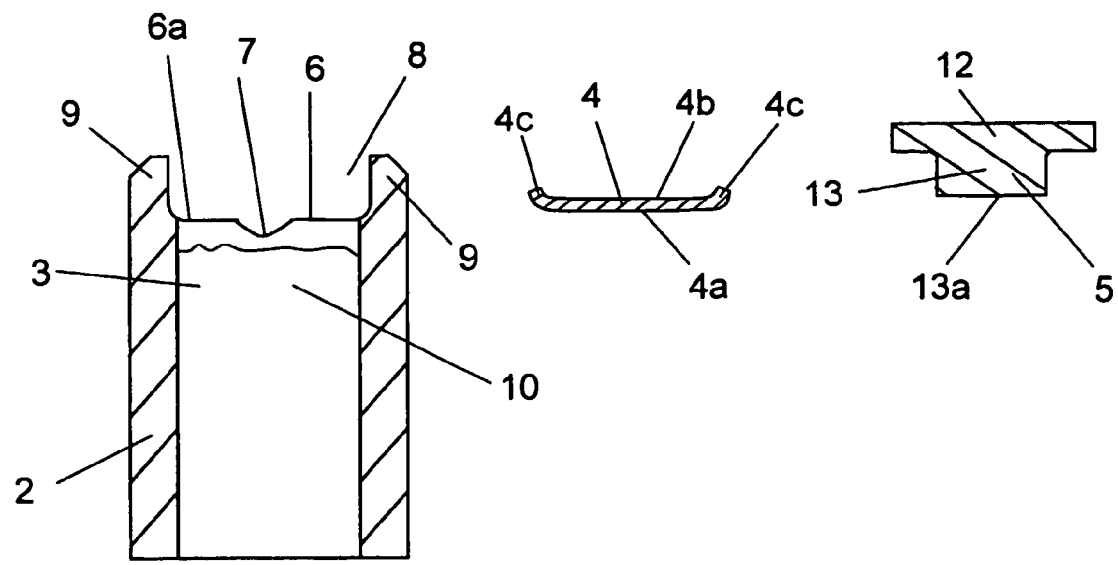
FIG. 3 shows a sectional view along the line A-A in FIG. 2

FIG. 3 shows a sectional view along the line A-A in FIG. 2.

Here, the design and the depth of the first U-shaped track 6 and the second triangular shaped track 7 are more clearly represented than in FIG. 2. The profile element 4 has a first surface 4a, which here is directed downwards. The first surface 4a has a shape, which substantially corresponds to the shape of the bottom surface 6a of the first track 6. The first surface 4a is substantially plane. However, the profile element 4 has at both its side edges curved portions 4c which have an extension upwards from the first surface 4a.

The curved portions 4c are arranged to follow the U-shaped first track 6 a small distance upwards from the substantially plane bottom surface 6a. The profile element 4 thereby obtains a form fit such that it is very simple to apply the profile element 4 in a desired position in the recess 8. The profile element 4 covers the outlets of the channels 3 in said position with a good margin. The cover element 5 has a substantially T-shaped cross sectional profile. Thereby, the cover portion 12 comprises a substantially upper rectangular cross section surface with a wall thickness dimensioned for enclosing fission gases with a specific pressure. The support portion 13 of the cover element 5 comprises a lower substantially rectangular cross section surface, which has a width, which exceeds the width of the second triangular-shaped track 7. The support portion 13 has a height such that a plane lower contact surface 13a gets into abutment with a corresponding plane second upper contact surface 4b of the profile element 4 when the upper surface of the cover portion 12 is located in level with the end surface of the legs 9. The channels 3 are thus filled with a powdered absorber material 10.

Figure 4:
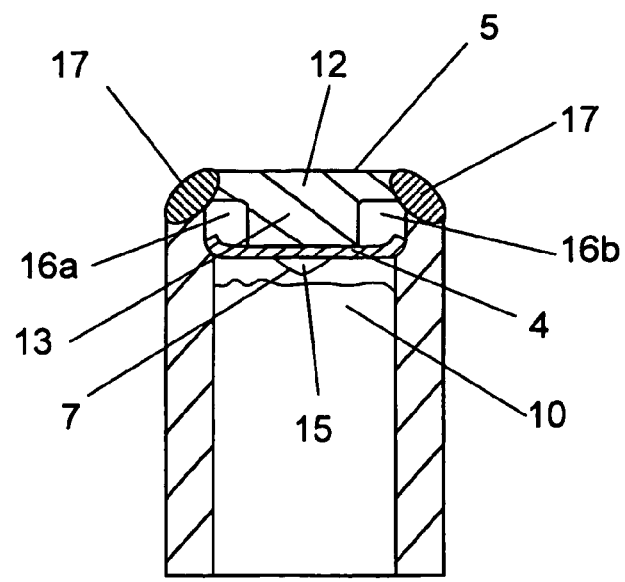
FIG. 4 shows a sectional view of a free edge portion of a control rod blade having a mounted profile element and cover element.

FIG. 4 shows a sectional view of an edge portion of a control rod blade 2 with a mounted profile element 4 and cover element 5. The mounting process comprises that the profile element 4 is applied in the recess 8 in the control rod blade 2. Consequently, the first surface 4a of the profile element has a shape, which substantially corresponds to the shape of the bottom surface 6a of the first U-shaped track 6. Thereby, it is simple to apply the profile element 4 in a correct position in the recess 8 such that it covers the outlets of all the channels 3. The profile element 4 covers in this position also the triangular shaped second track 7.

Thereby, a first passage 15 is provided under the profile element 4, which connects the channels 3 to each other in connection with the outlets of the channels 3. Thereafter, the cover element 5 is applied in the recess 8. Since the support portion 13 has a smaller width than the width of the recess 8, second elongated passages 16a, b are provided on both sides of the support portion 13. Since the profile element 4. is located over the second triangular shaped recess 7, the second passages 16a, b are separated from the first passage 15. When the cover element 5 is applied in the recess 8, a lower plane surface 13a of the support portion abuts a second plane upper surface 4b of the profile element. The contact surface 13a of the support element has a width, which exceeds the width of the triangular shaped track 7. The contact of the cover element 5 with the profile element 4 also results in that the profile element 4 is retained in a desired position in the recess 8.

The opening of the first U-shaped track 6 has a width, which substantially corresponds to the width of the cover portion 12. After that the cover element 5 has been applied in the recess 8, narrow substantially uniform gaps are however formed on both sides of the edges of the cover portion 13 and the legs 9 of the recess 8. By means of these gaps, a protective gas can be distributed to the elongated passages 16a, b. Thereafter, the edges of the cover portions 12 are welded together with the internal surfaces of the legs 9 by means of, for example, a TIG-burner such that two elongated weld joints 17 are formed. Consequently, the passages 16a, b allow a distribution of an inert gas to the root side of the weld joints 17 during the welding operation. Hereby, it is guaranteed that weld joints 17 with a high quality are obtained. Since the profile element 4 covers the outlets of the channels 3 in the recess 8 during the welding operation, it is also ensured that the powdered absorber material 10 in the channels can not whirl up and reach the weld joints 17.

Thereby, the powdered absorber material 10 does not risk to be mixed into the weld joints 17, which in such a case may deteriorate the quality of the weld joints essentially. Consequently, by the use of said profile element 4, it is guaranteed that weld joints 17 with a high quality are formed even when a powdered absorber material 10 is used.

After the welding operation, a sealing test of the control rod blade is performed. A vacuum pump is thereby connected, via a not shown leakage finding channel, which opens out in one of said channels 3. Since all channels 3 are connected to each other, via the first passage 15, an effective vacuum pumping of all channels 3 is achieved. The first passage 15 also has the task, during operation, to allow a flow of fission gases between the channels 3. The overpressure, which is created by the fission gases formed during operation can thereby be distributed substantially uniformly between all channels 3 of the control rod blade 2.

The present invention is not in any way restricted to the embodiment shown in the drawings but may be freely modified within the scope of the claims. The recess does not necessarily have to consist of a first U-shaped track 6 and a second triangular shaped track 7 but it may have a substantially arbitrary but functional shape.

What is claimed is:

1. A control rod blade for a boiling water reactor, comprising a plurality of channels each of a predetermined diameter and oriented about a longitudinal axis, said channels being arranged to receive an absorber material, a free edge portion with a recess, which includes outlets for said channels, and a cover element having a cover portion, said cover element being sealingly attached to said free edge portion to seal said recess, said cover portion is positioned outside of said recess and forms an external end surface of said control rod blade in a mounted state, a profile element having a thickness less than the diameter of the channels, wherein said thickness is measured along an axis of said profile element coaxial with said longitudinal axis, said profile element being disposed against a bottom surface defined by the recess; said profile element covers the outlets of said channels and wherein said profile element and said cover element engage one another and cooperate to define at least one passage there between.

2. A control rod blade according to claim 1, wherein the profile element has a width which substantially corresponds to a width defined by the bottom surface.

3. A control rod blade according to claim 1, wherein the profile element comprises a substantially plane surface, which is arranged to be applied against a corresponding substantially plane bottom surface.

4. A control rod blade according to claim 1, wherein the profile element comprises at least one curved side portion, which has an extension projecting outwardly from a substantially plane surface.

5. A control rod blade according to claim 1, wherein the profile element has a thickness of about 0.2-0.5 mm.

6. A control rod blade according to claim 1, wherein the profile element has a continuous extension along a whole length of the recess.

7. A control rod blade according to claim 1, wherein the profile element is manufactured of a metal material.

8. A control rod blade according to claim 1, wherein the cover element comprises a surface, which is arranged to abut a surface of the profile element when the cover element is applied in the recess.

9. A control rod blade according to claim 8, wherein the contact surfaces of the profile element and the cover element are substantially plane.

10. A control rod blade according to claim 1, wherein the cover element comprises support portion, which has a width, which is less than a width defined by the recess.

11. A control rod blade according to claim 1, wherein the recess comprises a groove which, after that the profile element has been applied in the recess, is arranged to form a passage, which extends between adjacent channels under the profile element.

12. A control rod blade according to claim 1, wherein the cover element is arranged to be attached at the edge portion of the control rod blade by means of two longitudinal weld joints.

13. A control rod blade according to claim 1, wherein the absorber material is powdered.

14. A control rod blade according to claim 13, wherein the absorber material comprises boron carbide.

* * * * *